Jan. 26, 1926.

P. E. FENTON 1,571,001

SEPARABLE FASTENER

Filed Oct. 29, 1924

Inventor:
Paul E. Fenton
by
Attorney.

Patented Jan. 26, 1926.

1,571,001

UNITED STATES PATENT OFFICE.

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT.

SEPARABLE FASTENER.

Application filed October 29, 1924. Serial No. 746,656.

*To all whom it may concern:*

Be it known that I, PAUL E. FENTON, a citizen of the United States, residing at Thomaston, in the county of Litchfield and State of Connecticut, have invented a certain new and useful Improvement in Separable Fasteners, of which the following is a full, clear, and exact description.

This invention relates to separable fasteners of the socket fastener type, and it is especially designed for use as a fastener for the curtains of vehicles, such as motor vehicles.

The novelty resides in the form or construction, the arrangement within the casing and the mode of operation of the stud-engaging spring which forms part of the socket member of the fastener, as I will proceed now to explain and finally claim.

Figure 1:
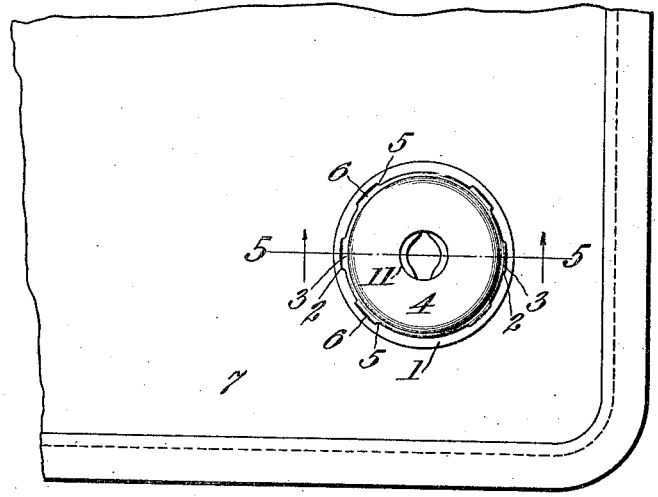
Figure 1:
Figure 1:
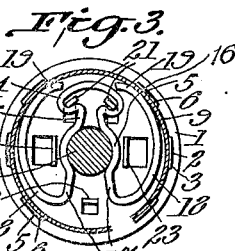
Figure 1:
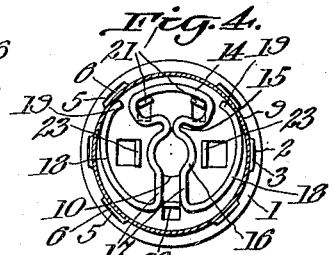
Figure 1:
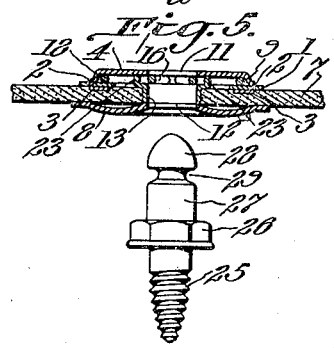
Figure 1:
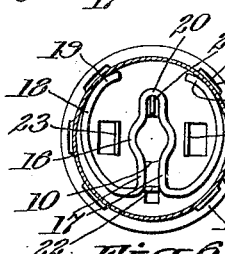
Figure 1:
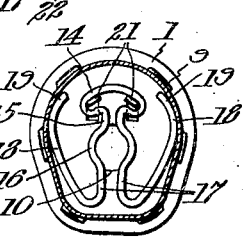
Figure 1:
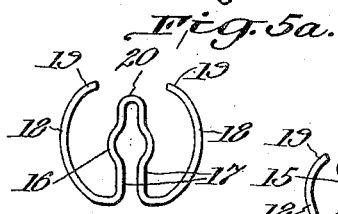
Figure 1:
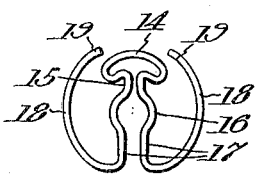
Figure 1:
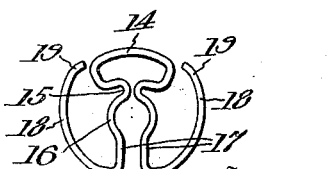

In the accompanying drawings illustrating the invention, in the several figures of which like parts are similarly designated, Figure 1 is a plan view of a corner of a vehicle curtain in which the socket member of the fastener is secured. Fig. 2 is a plan view of the socket member detached, and showing the casing in section. Fig. 3 is a view similar to Fig. 2 showing the operation of the spring in the act of engaging the stud member. Fig. 4 is a view similar to Fig. 2, but illustrating a modified form of spring. Fig. 5 is a transverse section taken on the line 5—5 of Fig. 1, and Fig. 5ª is an elevation of one form of stud adapted for use with the socket of the present invention. Fig. 6 is a view similar to Fig. 2 showing another modification of the form of the spring. Fig. 7 is a view similiar to Fig. 2 showing a spring like that shown in Fig. 2 of non-circular or approximate horseshoe shape. Figs. 8, 9, 10 and 11 are respectively plan views of the detached springs shown respectively in Figs. 2, 4, 6 and 7.

The casing may consist of a back plate 1, which may be of any usual or approved construction, slotted at 2 to receive lugs or prongs 3 on the cap or cover 4, which lugs or prongs are clinched on the back of the back plate, as shown in Fig. 5, so as to unite the back plate and cap or cover. This back plate is also provided with slots 5 for the passage of lugs or prongs 6 on the cap or cover and which extend through the material of the article, such as the curtain 7, to which the socket is applied and thence through slots, not shown, in the washer 8 placed on the opposite side of the article 7 next to the socket, said lugs or prongs 6 being clinched on said washer to thereby set the socket on the article 7. The means for connecting the back plate and cap or cover may be varied as desired or necessary.

The cap or cover 4 has a peripheral rim 9 which serves to raise it above the back plate, whereby there is formed a chamber between the cap or cover and back plate for the reception of the stud-engaging spring, presently described.

The back plate, the cap or cover and the washer are provided with openings 10, 11 and 12, respectively, for the passage of the stud member of the fastener, and said stud member, as shown in Fig. 5ª, may be of any usual or approved form suitable for cooperation with the socket, as hereinafter explained.

The opening 10 in the back plate preferably is provided with a flange 13, Fig. 5, extending rearwardly and forming a wall for the opening which extends through the article 7.

The spring preferably is constructed of a single piece of suitable spring wire, and comprises a loop 14 of oblong form and extending transversely, and of any of the designs shown in Figs. 2, 3, 4, 7, 8, 9 and 11, and having its outer portion described on the arc of a circle and with its lower portions bent inwardly to form the converging and substantially parallel and contacting portions or shoulders 15, and thence the limbs of the springs are bent outwardly on arcs of circles to form stud-engaging jaws 16 which are designed to overlie the opposite edges of the opening 10 in the back plate, and then the limbs are extended in straight parallel portions 17 spaced apart, and these straight portions extend past the said opening, and then the limbs are reverted as indicated at 18 and bent toward the loop in arcuate form so as to take a bearing for a portion of their length against the inner surface of the rim 9 of the cap or cover, the terminals 19 of these limbs being deflected toward the loop so as to define the surface contact of the spring with the inner surface of the rim 9, and insure freedom of movement of the spring limbs. This construction of the spring serves to locate the spring in the casing in proper position to engage the stud and hold it, and to properly control its resiliency in opening or expanding to receive and release the stud and closing or contracting to retain the stud.

The construction of the spring as a whole is such that its resiliency becomes effective throughout the entire spring.

The terminals 19 need not be deflected as shown and explained, but may be continued in the arcs of the portions 18, although the deflected construction is preferred for the reasons stated.

The loop 14 may be enlarged, as shown in Figs. 4 and 9 to afford greater longitudinal movement of the spring, and the shoulders may be correspondingly shortened as seen in the same views.

Instead of extending the looped end of the spring laterally it may be made to extend in the direction of the length of the parts 15 and 17, as shown at 20, in Figs. 6 and 10, and yet retain substantially the resilient qualities and operative efficiency of the spring previously described.

As shown in Figs. 7 and 11, the casing is of irregular or approximately horseshoe outline instead of circular, and the ends of the spring are modified accordingly. Otherwise the casing and spring are the same as already described.

In order to position the spring in the casing, upstanding lugs are provided, which may be made by striking them up from the back plate. These lugs in addition to their stated function serve also to support the cap or cover against externally applied blows or pressure. In the construction shown in Figs. 1, 2, 3, 4 and 5 there are a pair of lugs 21 extending within the loop at its opposite ends, and a lug 22 interposed between the straight portions 17 to limit their approach, and a pair of lugs 23 arranged opposite the jaws so as to limit their opening movement.

In Fig. 6 only one lug, 24, is necessary for engagement with the loop.

In Fig. 7 the lug between the straight portions of the spring may be dispensed with, inasmuch as the conformation of the casing practically effects a self-regulation of the approach of the parts, and also avoids the necessity of the use of lugs opposite the jaws, although as a matter of precaution, lugs may be provided at both of these points in this construction.

The stud shown in Fig. 5ª may be of any approved construction, as already indicated, but as shown comprises the screw end 25 for fastening it to a fixed part, a shouldered angular part 26 to fix the limit of insertion of the screw and to afford a hold for a wrench or other stud-applying implement, and a shank 27 having a conical head 28, there being an angular groove 29 interposed between the head and shank to engage with the jaws 16 of the spring when the socket is applied to the stud.

The construction of the spring is such that while the stud may be entered into the socket axially thereof, it cannot be withdrawn except by a tilting motion of the socket in the direction of the loop, and thereby the security of engagement of the stud and socket is enhanced and liability of accidental disconnection is practically avoided.

Furthermore, the construction of the spring is such that the whole spring expands in the operation of entering and withdrawing the stud, and hence the strain is distributed through the spring and thereby the durability as well as the efficiency of the spring increased.

The spring follows in its general outline the shape of the cavity or chamber within the socket in which it is arranged, and while the dimensions of the spring are enough smaller than the cavity or chamber in the socket to permit freedom of movement and expansion of the spring, there is no tendency of the spring to rattle within the socket.

The spring does not come into contact with the inner circumference of the cap or its rim, excepting at the contact surfaces of its limbs next to the terminals 19, being withheld from contact by the lugs 21, and hence the reverted portions 18 provide the longitudinal spring action along line $a-a'$, and the lateral spring action along line $b-b$, Fig. 2. The contracting of the spring is provided by the tendency of the contact surfaces to move it inwardly along the inner circumference of the rim of the cap and under combined forces of the stud exerted upon the shoulders and the longitudinal movement of the jaw portions of the spring.

When the stud and socket are engaged and it is desired to disengage them, the socket member is tipped upwardly from the point $a$ of line $a-a'$ toward the point $a'$, and in this movement the spring shoulders 15 bear against the groove 29 of the stud. Continued movement of the socket in this direction will serve to separate the jaws and the looped end of the spring will be moved toward the point $a'$. This movement causes the terminals 19 to approach one another and also causes the spreading or parting of the jaws sufficiently to allow the spring jaws to be loose in the groove of the stud, whereupon, upon further tipping, the jaws separate laterally along the line $b-b$ under the pressure of the stud, at the same time further contracting the spring at its terminals until the stud is fully disengaged whereupon the spring expands and returns to its normal closed position.

When the strain of tipping is applied in any other direction than that toward the looped end of the spring, as, for example, from either side or transversely of the spring, the spring will be bodily moved toward one or the other of the lugs 23, thus preventing the opening of the spring, and hence the spring will retain its grip on the stud. When it is attempted to release the stud by tipping the socket at the looped end of the spring, the engagement of the shoulders 15 with the groove 29 of the stud will not be disturbed, and hence the socket and stud cannot be separated by such tipping. The separation of the socket from the stud can be effected only by the described operation of tipping the socket from the point $a$ of line $a-a'$ toward the point $a'$.

If desired, the engagement of the socket and stud may be effected by movements the reverse of those just described.

Attention is directed to the facts that the spring is a self-closing device, and is bodily movable in one direction only, namely along the line $a-a'$, and has its reverted ends out of touch with the cap excepting at predetermined points, so that the spring is held in easy tension when at rest and its resiliency is exerted throughout its entire extent both in the operation of engaging and disengaging the members of the fastener.

Variations in details of construction are permissible within the principle of the invention and the claims following.

What I claim is:

1. A separable fastener socket member, having a spring chamber and a circumferential rim therefor, and a spring provided with a loop, said spring arranged in said chamber and having a limited lengthwise bodily movement therein and provided with limbs which have a limited surface contact near their terminals with said rim, said spring also having stud-engaging jaws located between said loop and a subjacent portion of the limbs.

2. A separable fastener socket member, having a spring chamber and a circumferential rim therefor, and a spring provided with a loop, said spring arranged in said chamber and having a limited lengthwise bodily movement in said chamber and provided with reverted limbs having terminals located adjacent to the loop of the spring and having a limited surface contact near their terminals with said rim, said spring also having stud-engaging jaws located between said loop and a subjacent portion of the limbs.

3. A separable fastener socket member, having a spring chamber provided with a circumferential rim, and a stud-engaging spring arranged in said chamber and having a loop at one end which is out of engagement with the rim, stud-engaging shoulders and jaws successively next to the loop, parallel portions next to the jaws and reverted portions next to the parallel portions, said reverted portions extending toward the loop and in limited surface contact with the rim near their extremities only, whereby the spring responds resiliently throughout and is free to move within the spring chamber without operative displacement under the operations of engaging the stud and being disengaged therefrom.

4. A separable fastener socket member, having a back plate provided with an opening for the reception of a complemental stud member, a spring having one end formed as a loop, arcuate portions forming jaws arranged adjacent to the opening in the back plate and thence extending in substantially parallel straight portions toward the periphery of the back plate and then bent outwardly in opposite directions and extended on arcs of circles in close proximity to the looped end, and a lug on the back plate arranged within and engaging the loop, another lug interposed between the parallel straight portions, and other lugs adjacent to the jaws, the construction of the spring being such that all parts of the spring respond resiliently to the action of the stud in the engagement of the stud with the socket and the withdrawal of the stud from the socket, and a cap or cover applied to the back plate over the spring and lugs.

5. A separable fastener socket member, having a casing provided with a spring chamber, and a looped spring arranged in said chamber and having stud-engaging jaws with shoulders interposed between themselves and the looped end, said spring having parallel portions extending from the jaws and their limbs reverted and terminating adjacent to the looped end of the spring, said spring having surface contact with the circumferential wall at limited places adjacent to their extremities and being otherwise free of contact therewith and having bodily movement within the chamber in the direction of its length.

6. A separable fastener socket member, having a casing provided with a spring chamber, and a spring arranged in said chamber and having a looped end provided with converging bends forming shoulders, circular portions next to said bends forming stud-engaging jaws, substantially straight parallel portions next to the jaws, and reverted portions extending thence toward the looped end, said spring being bodily movable within the chamber and having surface contact for limited distances between the extremities of its reverted portions and the circumscribing wall of the chamber, said spring reacting throughout its entire length under stresses of engaging and disengaging the stud.

7. A separable fastener socket member, having a back plate provided with an opening for the reception of a complemental stud member, a spring having one end formed as a loop substantially closed at its inner end next to the opening in the back plate by means of bends therein, arcuate portions forming jaws arranged adjacent to the opening in the back plate and thence extending in substantially parallel straight portions toward the periphery of the back plate and then bent outwardly in opposite directions and extended on arcs of circles into close proximity to the looped end, and lugs on the back plate engaging the loop, a lug intepposed between the parallel straight portions and other lugs adjacent to the jaws, the construction of the spring being such that all parts of the spring respond resiliently to the action of the stud in the engagement of the stud with the socket and the withdrawal of the stud from the socket.

8. A separable fastener socket member, having a back plate provided with an opening for the reception of a complemental stud member, a spring having one end formed as a loop substantially closed at its inner end next to the opening in the back plate by means of bends therein, arcuate portions forming jaws arranged adjacent to the opening in the back plate and thence extending in substantially parallel straight portions toward the periphery of the back plate and then bent outwardly in opposite directions and extended on arcs of circles into close proximity to the looped end, and lugs on the back plate engaging the loop, another lug interposed between the parallel straight portions and other lugs adjacent to the jaws, the construction of the spring being such that all parts of the spring respond resiliently to the action of the stud in the engagement of the stud with the socket and the withdrawal of the stud from the socket, and a cap or cover applied to the back plate and adapted for setting the socket on an article.

In testimony whereof I have hereunto set my hand this 22nd day of September A. D. 1924.

PAUL E. FENTON.